(12) United States Patent
Yamazaki et al.

(10) Patent No.: US 12,611,927 B2
(45) Date of Patent: Apr. 28, 2026

(54) DRIVE SYSTEM FOR FOUR-WHEEL DRIVE VEHICLE

(71) Applicant: SUBARU CORPORATION, Tokyo (JP)

(72) Inventors: Yoshinobu Yamazaki, Tokyo (JP); Masami Oguri, Tokyo (JP); Akihiro Nabeshima, Tokyo (JP); Yoshiyuki Jin, Tokyo (JP); Takeshi Yoneda, Tokyo (JP); Fumiya Sato, Tokyo (JP); Hiroshi Kusano, Tokyo (JP); Keigo Yamada, Tokyo (JP); Takumi Araki, Tokyo (JP); Shuntaro Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 416 days.

(21) Appl. No.: 18/144,454

(22) Filed: May 8, 2023

(65) Prior Publication Data

US 2023/0373295 A1 Nov. 23, 2023

(30) Foreign Application Priority Data

May 18, 2022 (JP) ................................. 2022-081505

(51) Int. Cl.
*B60L 7/20* (2006.01)
*B60K 1/02* (2006.01)
(Continued)

(52) U.S. Cl.
CPC ............ *B60K 17/3462* (2013.01); *B60K 1/02* (2013.01); *B60K 17/356* (2013.01); *B60L 7/18* (2013.01); *B60L 7/24* (2013.01)

(58) Field of Classification Search
CPC .... B60K 17/3462; B60K 1/02; B60K 17/356; B60K 17/16; B60K 17/22; B60K 23/0808; B60L 7/18; B60L 7/24; B60L 7/10
See application file for complete search history.

(56) References Cited

U.S. PATENT DOCUMENTS

| | | | | |
|---|---|---|---|---|
| 2014/0284130 | A1* | 9/2014 | Knoblauch | ......... B60L 15/2036 180/242 |
| 2020/0215906 | A1* | 7/2020 | Shimazaki | ............. B60K 23/08 |

(Continued)

FOREIGN PATENT DOCUMENTS

| | | | | |
|---|---|---|---|---|
| DE | 102005057285 A1 * | 3/2007 | ........... | B60T 8/1769 |
| JP | 2015-506862 A | 3/2015 | | |

(Continued)

OTHER PUBLICATIONS

Japanese Office Action dated Jan. 6, 2026 in Japanese Patent Application No. 2022-081505 with English translation.

*Primary Examiner* — Zakaria Elahmadi
(74) *Attorney, Agent, or Firm* — McGinn IP Law Group, PLLC

(57) ABSTRACT

A drive system for a four-wheel drive vehicle including a friction brake system includes a first motor and a second motor, a propeller shaft for transmitting power between a front-wheel side and a rear-wheel side, a first differential mechanism configured to divide output torque of the first motor between a left wheel on one side of the front-wheel side and the rear-wheel side and the other side, a second differential mechanism configured to divide output torque of the second motor between a right wheel on the one side and the other side, and a control device for controlling regenerative braking force related to the first motor and the second motor and friction braking force related to the friction brake system. The first and second differential mechanisms are (Continued)

configured such that the ratio of output torque allocated to the front-wheel side is 50% or more.

20 Claims, 6 Drawing Sheets

(51) Int. Cl.
| | |
|---|---|
| *B60K 17/346* | (2006.01) |
| *B60K 17/356* | (2006.01) |
| *B60L 7/18* | (2006.01) |
| *B60L 7/24* | (2006.01) |

(56) References Cited

U.S. PATENT DOCUMENTS

| | | | |
|---|---|---|---|
| 2021/0033182 A1* | 2/2021 | Murakami | B60K 23/0808 |
| 2021/0237584 A1* | 8/2021 | Tabata | B60L 7/26 |

FOREIGN PATENT DOCUMENTS

| | | |
|---|---|---|
| JP | 2016-123207 A | 7/2016 |
| JP | 2020-104572 A | 7/2020 |
| JP | 2021-020640 A | 2/2021 |

* cited by examiner

DRIVE SYSTEM FOR FOUR-WHEEL DRIVE VEHICLE

CROSS-REFERENCE TO RELATED APPLICATIONS

The present application claims priority from Japanese Patent Application No. 2022-081505 filed on May 18, 2022, the entire contents of which are hereby incorporated by reference.

BACKGROUND

The disclosure relates to a drive system for an electric-motor propelled four-wheel drive vehicle.

In recent years, electric vehicles with four-wheel drive using the outputs of electric motors as driving force have been developed. For example, Japanese Unexamined Patent Application Publication (Translation of PCT Application) (JP-T) No. 2015-506862 discloses a drive system for a purely electrically all-wheel drivable motor vehicle; the drive system is operable to drive front, rear, left, and right drive wheels. For example, in the drive system presented in JP-T No. 2015-506862, differentials are disposed in front and rear axles, and a portion of drive torque of two electric motors on the left and right sides connected with one of the axles is transmitted to the differential of the other axle via right-angle gears and a propeller shaft, thereby driving the four wheels.

With the drive system disclosed in JP-T No. 2015-506862, the rotation difference between the front and rear wheels caused by, for example, the turning radius difference during turning is to be canceled out using couplings or other parts. This can limit the flexibility of control as regards the distribution of torque between the front and rear sides. In contrast, Japanese Unexamined Patent Application Publication No. 2021-020640 presents a drive system for a four-wheel drive vehicle, operable to control driving force transmitted to front, rear, left, and right drive wheels with the control on outputs of left and right electric motors without using any mechanisms for cancelling differential rotation of the front and rear sides such as couplings.

SUMMARY

An aspect of the disclosure provides a drive system for an electric-motor propelled four-wheel drive vehicle having a friction brake system. The drive system includes a first motor and a second motor, a propeller shaft, a first differential mechanism, a second differential mechanism, and a control device. The propeller shaft is configured to transmit power between a front-wheel side and a rear-wheel side. The first differential mechanism is coupled to the first motor, configured to divide output torque of the first motor between a first side of the front-wheel side and the rear-wheel side and a left wheel on a second side of the front-wheel side and the rear-wheel side that is different from the first side. The second differential mechanism is coupled to the second motor, configured to divide output torque of the second motor between the first one side and a right wheel on the second side. The control device is configured to control regenerative braking force acting as a result of causing the first motor and the second motor to operate in a regeneration mode and friction braking force generated by the friction brake system. Each of the first differential mechanism and the second differential mechanism is configured such that the allocation ratio of output torque allocated to the front-wheel side is 50% or more.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
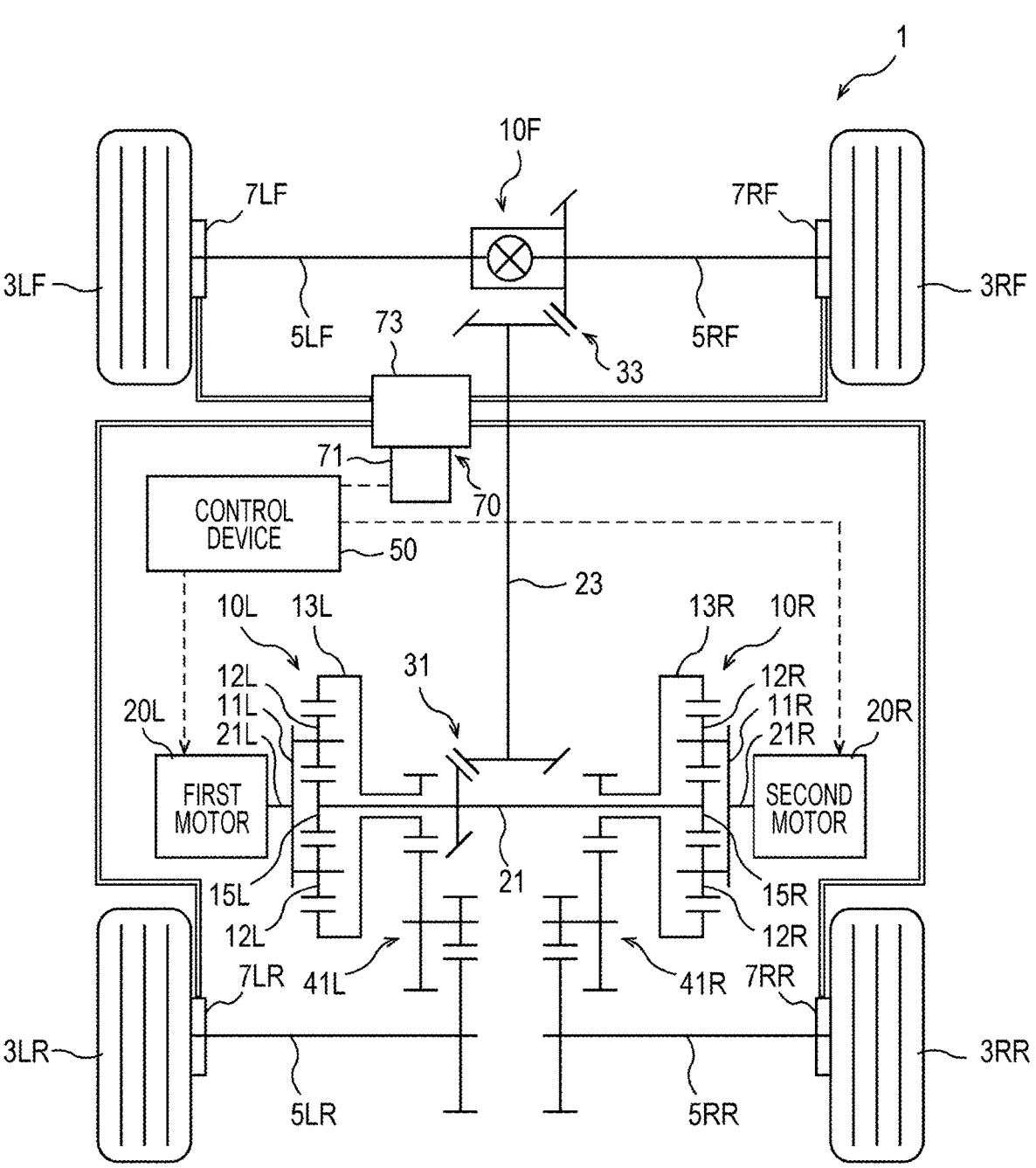
FIG. 1 is a schematic diagram illustrating a configuration example of a drive system for a four-wheel drive vehicle according to an embodiment of the disclosure.

The allocation of driving force between the front-wheel and rear-wheel sides in a four-wheel drive vehicle is determined based on the running performance of the vehicle and is achieved by the design of differential mechanisms. For example, when higher importance is attached to the maneuverability, turning performance, and acceleration performance of the vehicle body, the differential mechanisms used are designed such that the allocation ratio of the rear-wheel side is higher than the allocation ratio of the front-wheel side. By contrast, when higher importance is attached to the running stability in straight running and the fuel efficiency performance, the differential mechanisms used are designed such that the allocation ratio of the front-wheel side is higher than the allocation ratio of the rear-wheel side. The allocation ratio of driving force achieved by the differential mechanisms is also used to divide the regenerative braking force of the electric motor.

An automobile using an electric motor as a power source is able to run without wasting deceleration energy by converting deceleration energy to regenerative energy. An automobile using an electric motor as a power source is also able to decelerate and accelerate by using one actuating pedal. The regenerative braking force generated during deceleration is calculated based on the target deceleration speed with consideration of the running resistance and weight of the vehicle. At high vehicle speeds, the rotation speed of the electric motor is also high, and as a result, the vehicle is decelerated by regenerative braking with the electric motor; at significantly low vehicle speeds, the rotation speed of the electric motor is relatively low, and thus, friction braking is used in conjunction with regenerative braking. This means that after a vehicle starts to decelerate, in the state in which the braking force requested by a driver is being generated mainly by regenerative braking, the vehicle speed decreases to a predetermined vehicle speed; afterward, the ratio of regenerative braking force decreases, whereas the ratio of friction braking force increases.

While a vehicle decelerates in forward running, the load on the front-wheel side increases. A friction brake system is thus usually designed or controlled such that the allocation ratio of brake torque allocated to the front-wheel side is higher than the allocation ratio of brake torque allocated to the rear-wheel side. As described above, in the case where a drive system for an electric-motor propelled four-wheel drive vehicle includes differential mechanisms that make the allocation ratio of the rear-wheel side higher than the allocation ratio of the front-wheel side, when the ratio of friction braking force increases while the ratio of regenerative braking force decreases, the allocation ratio of braking force between the front-wheel and rear-wheel sides suddenly changes. As a result, when the friction coefficient of the surface of a road is relatively small, the behavior of the vehicle can become unstable.

It is desirable to provide a drive system for an electric-motor propelled four-wheel drive vehicle that hinders unstable vehicle behavior when the four-wheel drive vehicle decelerates.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Configuration of Drive System

The overall configuration of a drive system for a four-wheel drive vehicle according to the embodiment of the disclosure will be described with reference to FIG. 1. In the present embodiment, a drive system for an electric-motor propelled all-wheel drive (AWD) vehicle is described as an instance; in the drive system, the output torque of two electric motors on the left and right sides is divided between the front and rear wheels.

FIG. 1 is a schematic diagram of the overall configuration of a drive system 1 according to the present embodiment. The drive system 1 includes a first motor 20L, a second motor 20R, a first differential mechanism 10L, a second differential mechanism 10R, a first right-angle gear 31, a propeller shaft 23, a second right-angle gear 33, and a third differential mechanism 10F. The first motor 20L and the second motor 20R are, for example, known three-phase alternating-current synchronous motors. A control device 50 provides control to drive the first motor 20L and the second motor 20R by controlling an inverter that is not illustrated in the drawings. An output shaft 21L of the first motor 20L is coupled to the first differential mechanism 10L. An output shaft 21R of the second motor 20R is coupled to the second differential mechanism 10R.

The first differential mechanism 10L has a planetary gear train including a sun gear 15L, pinion gears 12L, a ring gear 13L, and a carrier 11L supporting the pinion gear 12L. The output shaft 21L of the first motor 20L is coupled to the carrier 11L. The output torque of the first motor 20L is transmitted to the first differential mechanism 10L via the carrier 11L. The first differential mechanism 10L divides the output torque of the first motor 20L between a left rear wheel 3LR and the front-wheel side. A portion of the output torque of the first motor 20L is transmitted through the ring gear 13L and a gear train 41L to a drive axle 5LR of the left rear wheel 3LR. A portion of the output torque of the first motor 20L is transmitted through the sun gear 15L to an intermediate output shaft 21 and further transmitted through the first right-angle gear 31 to the propeller shaft 23.

The second differential mechanism 10R has a planetary gear train including a sun gear 15R, pinion gears 12R, a ring gear 13R, and a carrier 11R supporting the pinion gears 12R. The output shaft 21R of the second motor 20R is coupled to the carrier 11R. The output torque of the second motor 20R is transmitted to the second differential mechanism 10R via the carrier 11R. The second differential mechanism 10R divides the output torque of the second motor 20R between a right rear wheel 3RR and the front-wheel side. A portion of the output torque of the second motor 20R is transmitted through the ring gear 13R and a gear train 41R to a drive axle 5RR of the right rear wheel 3RR. A portion of the output torque of the second motor 20R is transmitted through the sun gear 15R to the intermediate output shaft 21 and further transmitted through the first right-angle gear 31 to the propeller shaft 23.

While the four-wheel drive vehicle accelerates, the first differential mechanism 10L divides the drive torque outputted by the first motor 20L between the left rear wheel 3LR and the front-wheel side by a predetermined allocation ratio. While the four-wheel drive vehicle decelerates, the first differential mechanism 10L divides the regenerative torque generated by the first motor 20L between the left rear wheel 3LR and the front-wheel side by a predetermined allocation ratio. Similarly, while the four-wheel drive vehicle accelerates, the second differential mechanism 10R divides the drive torque outputted by the second motor 20R between the right rear wheel 3RR and the front-wheel side by a predetermined allocation ratio. While the four-wheel drive vehicle decelerates, the second differential mechanism 10R divides the regenerative torque generated by the second motor 20R between the right rear wheel 3RR and the front-wheel side by a predetermined allocation ratio. In the present embodiment, the first differential mechanism 10L and the second differential mechanism 10R are individually configured such that the allocation ratio of output torque allocated to the front-wheel side is 50% or more.

The propeller shaft 23 is coupled via the second right-angle gear 33 to the third differential mechanism 10F coupled to a drive axle 5LF of a left front wheel 3LF and a drive axle 5RF of a right front wheel 3RF. The third differential mechanism 10F has a known differential gear including two side gears respectively coupled to the drive axle 5LF of the left front wheel 3LF and the drive axle 5RF of the right front wheel 3RF and pinion gears meshing with the two side gears, which are not illustrated in the drawings. The third differential mechanism 10F is operable to cause differential rotation with the left front wheel 3LF and the right front wheel 3RF, for example, while turning or running on a rough road.

The propeller shaft 23 transmits driving force between the first motor 20L and the second motor 20R, and the front-wheel side. A portion of the output torque of the first motor 20L and a portion of the output torque of the second motor 20R are transmitted to the common intermediate output shaft 21, and the torque combined is transmitted through the first right-angle gear 31, the propeller shaft 23, and the second right-angle gear 33 to the third differential mechanism 10F. The third differential mechanism 10F divides torque between the left front wheel 3LF and the right front wheel 3RF based on the frictional resistance or rolling resistance of the left front wheel 3LF and the right front wheel 3RF.

In the present embodiment, the output shaft 21L of the first motor 20L and the output shaft 21R of the second motor 20R are disposed parallel to the drive axle 5LR of the left rear wheel 3LR and the drive axle 5RR of the right rear wheel 3RR. As a result, it is possible to efficiently transmit the output torque outputted by the first motor 20L and the output torque outputted by the second motor 20R to the drive axle 5LR of the left rear wheel 3LR and the drive axle 5RR of the right rear wheel 3RR by using spur gears without any right-angle gear.

The four-wheel drive vehicle provided with the drive system 1 according to the present embodiment includes a friction brake system 70. The friction brake system 70 illustrated in FIG. 1 is configured as an oil brake system, but this is not to be interpreted as limiting. A hydraulic unit 73 controls the pressure of oil supplied to individual brake calipers 7LF, 7RF, 7LR, and 7RR (hereinafter collectively referred to as the "brake calipers 7" when the brake calipers 7LF, 7RF, 7LR, and 7RR are not distinguished from each other) respectively provided for the front, rear, left, and right drive wheels 3LF, 3RF, 3LR, and 3RR to generate braking force. A brake control device 71 including at least one processor and at least one memory provides control to actuate the hydraulic unit 73. Friction braking with the friction brake system 70 is used in conjunction with regenerative braking with the first motor 20L and the second motor 20R.

The control device 50 includes at least one processor such as a central processing unit (CPU) and at least one memory. A portion or all of the control device 50 may be implemented by, for example, updatable software such as firmware or a program module executable according to instructions provided by, for example, the CPU. The memory may be implemented by, for example, a random-access memory (RAM) or a read-only memory (ROM). The memory is not particularly limited with respect to the number and types of memories. The memory stores a computer program to be run by the processor and information such as various parameters to be used in computational processing, detection data, and computation results.

The control device 50 serves as a device for providing brake control of the four-wheel drive vehicle by running a computer program with the at least one processor. The computer program is configured to cause the processor to perform the operations to be performed by the control device 50. The operations will be described later. The computer program to be run by the processor may be recorded in a recording medium serving as the memory included in the control device 50; alternatively, the computer program may be recorded in a recording medium provided in the control device 50 or any recording medium externally connectable to the control device 50.

The recording medium for recording the computer program may take many forms including any type of magnetic medium such as a hard disk, a floppy disk, and a magnetic tape, any type of optical recording medium such as a compact disc read-only memory (CD-ROM), a digital versatile disc (DVD), a solid state drive (SSD), and a Blu-ray (registered trademark) disc, any type of magneto-optical medium such as a Floptical disk, any type of storage element such as a RAM and a ROM, any type of flash memory such as a Universal Serial Bus (USB) memory, and any other types of medium capable of storing programs.

In the drive system 1, the drive axles 5LF and 5RF on the front-wheel side are coupled to each other with the third differential mechanism 10F interposed between the drive axles 5LF and 5RF. The drive axles 5LR and 5RR on the rear-wheel side are coupled via the first differential mechanism 10L and the second differential mechanism 10R, so that the rotation of one of the rear wheels is not transmitted directly to the other. While the four-wheel drive vehicle accelerates, the drive torque outputted by the first motor 20L is divided between the left rear wheel 3LR and the front-wheel side, and the drive torque outputted by the second motor 20R is divided between the right rear wheel 3RR and the front-wheel side. At this time, drive torque is divided based on the load or rolling resistance of the individual front, rear, left, and right drive wheels.

While the four-wheel drive vehicle turns, the control device 50 controls the drive torque outputted by the first motor 20L and the drive torque outputted by the second motor 20R with consideration of, for example, differential rotation due to the turning radius difference between the left and right rear wheels. As such, torque vectoring control for controlling output torque transmitted to front, rear, left, and right drive wheels is performed.

While the four-wheel drive vehicle decelerates, the control device 50 provides cooperative control of friction braking with the friction brake system 70 and regenerative braking with the first motor 20L and the second motor 20R. During this control, regenerative brake torque is divided between the front-wheel side and the rear-wheel side by the first differential mechanism 10L and the second differential mechanism 10R.

2. Operational Example

The following describes in detail an operational example of the drive system 1 according to the present embodiment. In the operational example described below, the allocation ratio of torque divided between the front-wheel side and the rear-wheel side by the first differential mechanism 10L and the second differential mechanism 10R is 55:45. However, the allocation ratio of torque divided between the front-wheel side and the rear-wheel side is not limited to this instance; it is sufficient that the allocation ratio of torque allocated to the front-wheel side be 50% or more.

Figure 2:
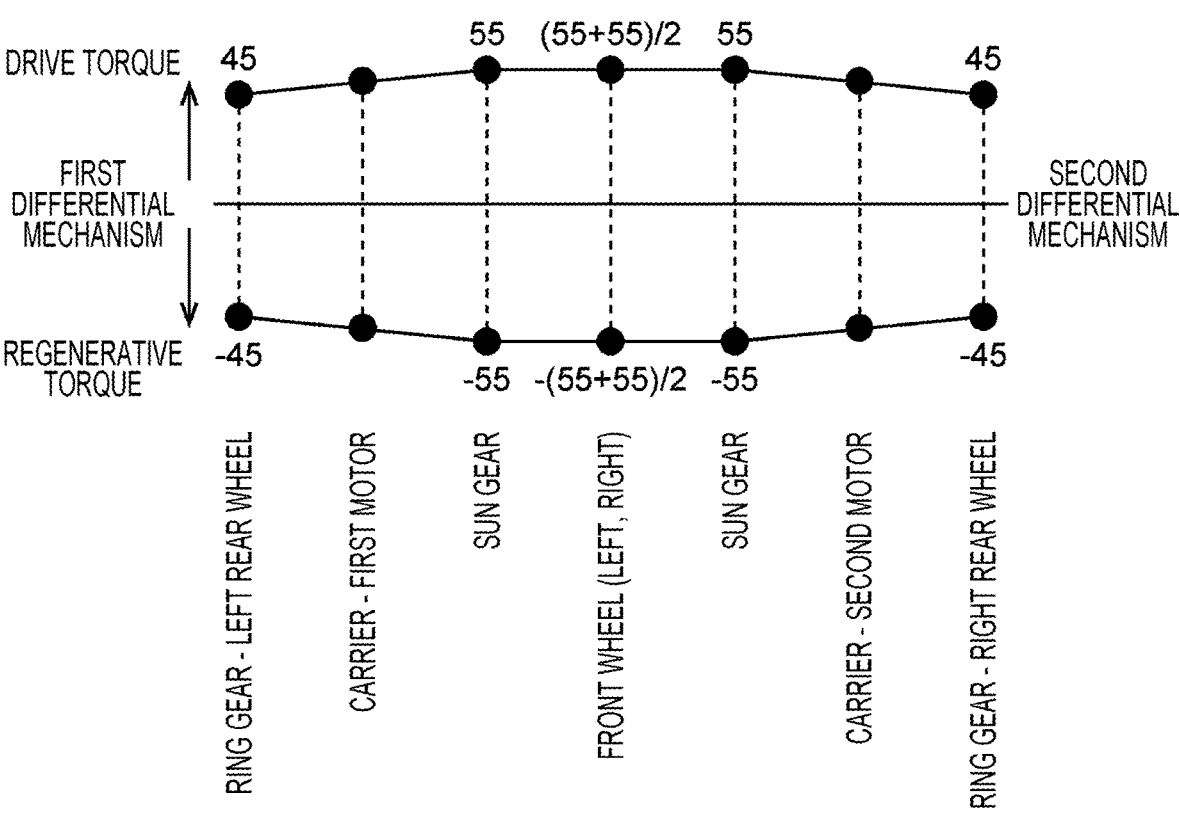
FIG. 2 illustrates an operational example of the drive system for a four-wheel drive vehicle according to the embodiment.

FIG. 2 indicates the torque (in relative value) transmitted to each of the front, rear, left, and right drive wheels, given that the output torque of the first motor 20L corresponds to a relative value of 100, and the output torque of the second motor 20R corresponds to a relative value of 100. The output torque of positive values represents drive torque, and the output torque of negative values represents regenerative torque.

While the four-wheel drive vehicle accelerates in straight running, the drive torque outputted by the first motor 20L is transmitted through the carrier 11L to the first differential mechanism 10L and divided between the left rear wheel 3LR and the intermediate output shaft 21 coupled to the front-wheel side by the ratio of 45:55. In the instance illustrated in FIG. 2, the drive torque corresponding to a relative value of 45 is transmitted through the ring gear 13L to the left rear wheel 3LR, and the drive torque corresponding to a relative value of 55 is transmitted via the sun gear 15L to the intermediate output shaft 21.

The drive torque outputted by the second motor 20R is transmitted through the carrier 11R to the second differential mechanism 10R and divided between the right rear wheel 3RR and the intermediate output shaft 21 coupled to the front-wheel side by the ratio of 45:55. In the instance illustrated in FIG. 2, the drive torque corresponding to a relative value of 45 is transmitted through the ring gear 13R to the right rear wheel 3RR, and the drive torque corresponding to a relative value of 55 is transmitted via the sun gear 15R to the intermediate output shaft 21.

The drive torque (a relative value of 55) transmitted to the intermediate output shaft 21 out of the drive torque outputted by the first motor 20L and the drive torque (a relative value of 55) transmitted to the intermediate output shaft 21 out of the drive torque outputted by the second motor 20R add up to a total torque (a relative value of 110); the total torque (a relative value of 110) is transmitted through the first right-angle gear 31, the propeller shaft 23, and the second right-angle gear 33 to the third differential mechanism 10F. As a result, in total, the drive torque corresponding to a relative value of 110 is transmitted to the left front wheel 3LF and the right front wheel 3RF; the drive torque is divided between the left front wheel 3LF and the right front wheel 3RF by the ratio of 50:50, that is, the ratio of 55:55 in relative value.

While the four-wheel drive vehicle decelerates in straight running or turning, the regenerative torque generated by the first motor 20L is transmitted through the carrier 11L to the first differential mechanism 10L and divided between the left rear wheel 3LR and the intermediate output shaft 21 coupled to the front-wheel side by the ratio of 45:55. In the instance illustrated in FIG. 2, the regenerative torque corresponding to a relative value of –45 is transmitted through the ring gear 13L to the left rear wheel 3LR, and the regenerative torque corresponding to a relative value of –55 is transmitted via the sun gear 15L to the intermediate output shaft 21.

The regenerative torque generated by the second motor 20R is transmitted through the carrier 11R to the second differential mechanism 10R and divided between the right rear wheel 3RR and the intermediate output shaft 21 coupled to the front-wheel side by the ratio of 45:55. In the instance illustrated in FIG. 2, the regenerative torque corresponding to a relative value of –45 is transmitted through the ring gear 13R to the right rear wheel 3RR, and the regenerative torque corresponding to a relative value of –55 is transmitted via the sun gear 15R to the intermediate output shaft 21.

The regenerative torque (a relative value of –55) transmitted to the intermediate output shaft 21 out of the regenerative torque generated by the first motor 20L and the regenerative torque (a relative value of –55) transmitted to the intermediate output shaft 21 out of the regenerative torque generated by the second motor 20R add up to a total torque (a relative value of –110); the total torque (a relative value of –110) is transmitted through the first right-angle gear 31, the propeller shaft 23, and the second right-angle gear 33 to the third differential mechanism 10F. As a result, in total, the regenerative torque corresponding to a relative value of –110 is transmitted to the left front wheel 3LF and the right front wheel 3RF; the regenerative torque is divided between the left front wheel 3LF and the right front wheel 3RF by the ratio of 50:50, that is, the ratio of –55:–55 in relative value.

Figure 3:
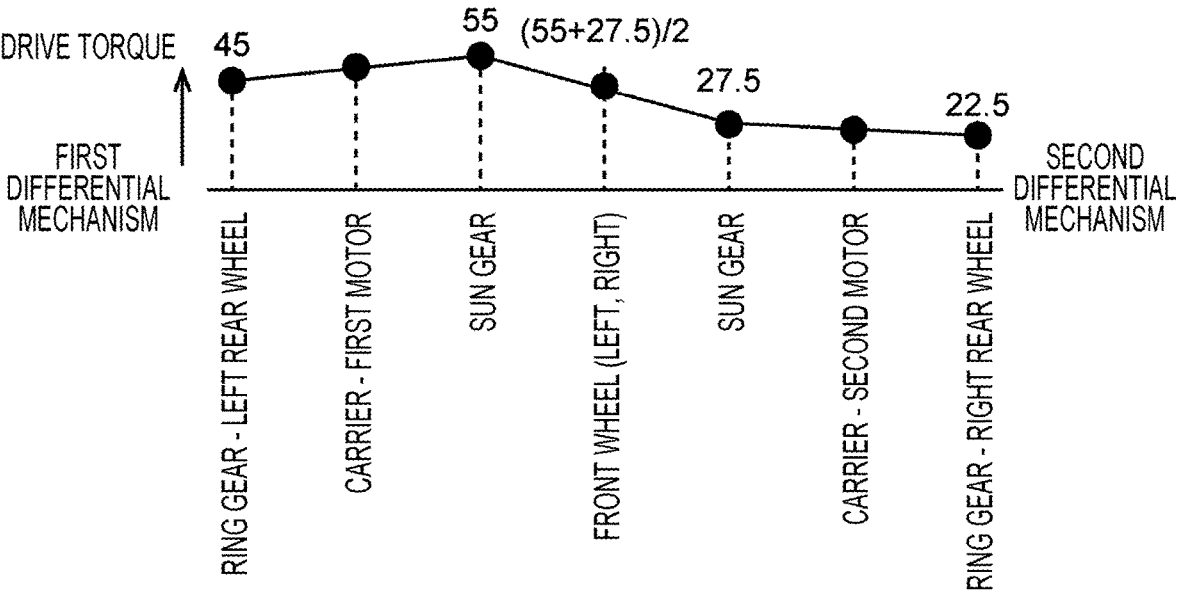
FIG. 3 illustrates another operational example of the drive system for a four-wheel drive vehicle according to the embodiment.

FIG. 3 indicates the torque (in relative value) transmitted to each of the front, rear, left, and right drive wheels while the four-wheel drive vehicle turns, given that the drive torque outputted by the first motor 20L corresponds to a relative value of 100, and the drive torque outputted by the second motor 20R corresponds to a relative value of 50.

The drive torque outputted by the first motor 20L is transmitted through the carrier 11L to the first differential mechanism 10L and divided between the left rear wheel 3LR and the intermediate output shaft 21 coupled to the front-wheel side by the ratio of 45:55. In the instance illustrated in FIG. 3, the drive torque corresponding to a relative value of 45 is transmitted through the ring gear 13L to the left rear wheel 3LR, and the drive torque corresponding to a relative value of 55 is transmitted via the sun gear 15L to the intermediate output shaft 21.

The drive torque outputted by the second motor 20R is transmitted through the carrier 11R to the second differential mechanism 10R and divided between the right rear wheel 3RR and the intermediate output shaft 21 coupled to the front-wheel side by the ratio of 45:55. In the instance illustrated in FIG. 3, the drive torque corresponding to a relative value of 22.5 is transmitted through the ring gear 13R to the right rear wheel 3RR, and the drive torque corresponding to a relative value of 27.5 is transmitted via the sun gear 15R to the intermediate output shaft 21.

The drive torque (a relative value of 55) transmitted to the intermediate output shaft 21 out of the drive torque outputted by the first motor 20L and the drive torque (a relative value of 27.5) transmitted to the intermediate output shaft 21 out of the drive torque outputted by the second motor 20R add up to a total torque (a relative value of 82.5); the total torque (a relative value of 82.5) is transmitted through the first right-angle gear 31, the propeller shaft 23, and the second right-angle gear 33 to the third differential mechanism 10F. As a result, in total, the drive torque corresponding to a relative value of 82.5 is transmitted to the left front wheel 3LF and the right front wheel 3RF; the drive torque is divided between the left front wheel 3LF and the right front wheel 3RF by the ratio of 50:50, that is, the ratio of 41.25:41.25 in relative value.

As described above, in the drive system 1 according to the present embodiment, the drive torque transmitted to each of the front, rear, left, and right drive wheels is controlled by appropriately controlling the output of the first motor 20L, which outputs the torque to be divided between the left rear wheel 3LR and the front-wheel side, and the output of the second motor 20R, which outputs the torque to be divided between the right rear wheel 3RR and the front-wheel side. The drive system 1 does not use any mechanisms for cancelling differential rotation of the front and rear wheels such as couplings. This increases the flexibility to directly control the drive torque transmitted to the individual front, rear, left, and right drive wheels.

3. Cooperative Brake Control

The following describes in detail cooperative brake control using friction braking and regenerative braking with the drive system 1 according to the present embodiment.

Figure 4:
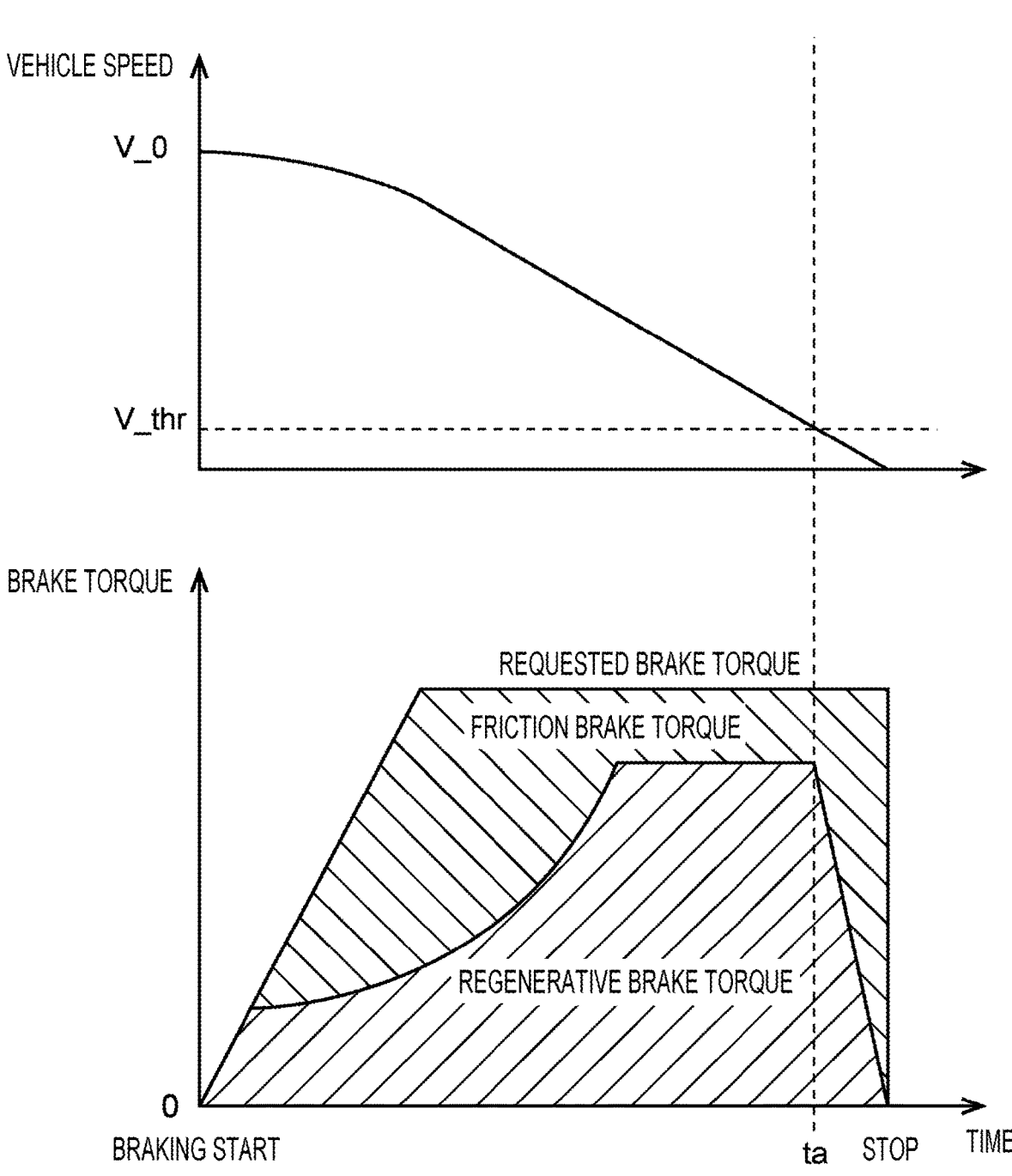
FIG. 4 illustrates proportions of brake torque in the drive system for a four-wheel drive vehicle according to the embodiment.

FIG. 4 illustrates cooperative brake control by the control device 50. FIG. 4 illustrates an instance of changes with time of the requested brake torque requested by a driver during manual driving or the requested brake torque calculated during automated driving and changes with time in the proportions of friction brake torque and regenerative brake torque in the requested brake torque.

It is assumed that after braking starts at a vehicle speed of V_0, the requested brake torque keeps increasing for a while and then remains at a fixed value; the four-wheel drive vehicle consequently stops. The control device 50 calculates regenerative brake torque using the running resistance and vehicle weight, based on a braking operation by the driver or a target deceleration rate in automatic driving control. At this time, because at high vehicle speeds the rotation speed of the first motor 20L and the second motor 20R is relatively high, the proportion of regenerative brake torque generated by the first motor 20L and the second motor 20R is made large.

By contrast, because at low vehicle speeds the rotation speed of the first motor 20L and the second motor 20R is relatively low, the magnitude of regenerative brake torque generated by the first motor 20L and the second motor 20R is limited. Hence, after a time to by which the vehicle speed has decreased to a predetermined threshold V_thr, while the proportion of regenerative brake torque decreases to zero, the proportion of friction brake torque increases.

At this time, because the allocation ratio of friction brake torque allocated to the front-wheel side is higher than the allocation ratio of friction brake torque allocated to the rear-wheel side, if the allocation ratio of regenerative brake torque allocated to the front-wheel side is lower than the allocation ratio of regenerative brake torque allocated to the rear-wheel side, a sudden change can occur in the allocation ratio of brake torque between the front-wheel side and the rear-wheel side. In the present embodiment, the first differential mechanism 10L and the second differential mechanism 10R are configured such that the allocation ratio of output torque allocated to the front-wheel side is 50% or more. This reduces the likelihood of a sudden change in the allocation ratio of brake torque between the front-wheel side and the rear-wheel side due to a sudden change in the proportions of regenerative brake torque and friction brake torque.

Figure 5:
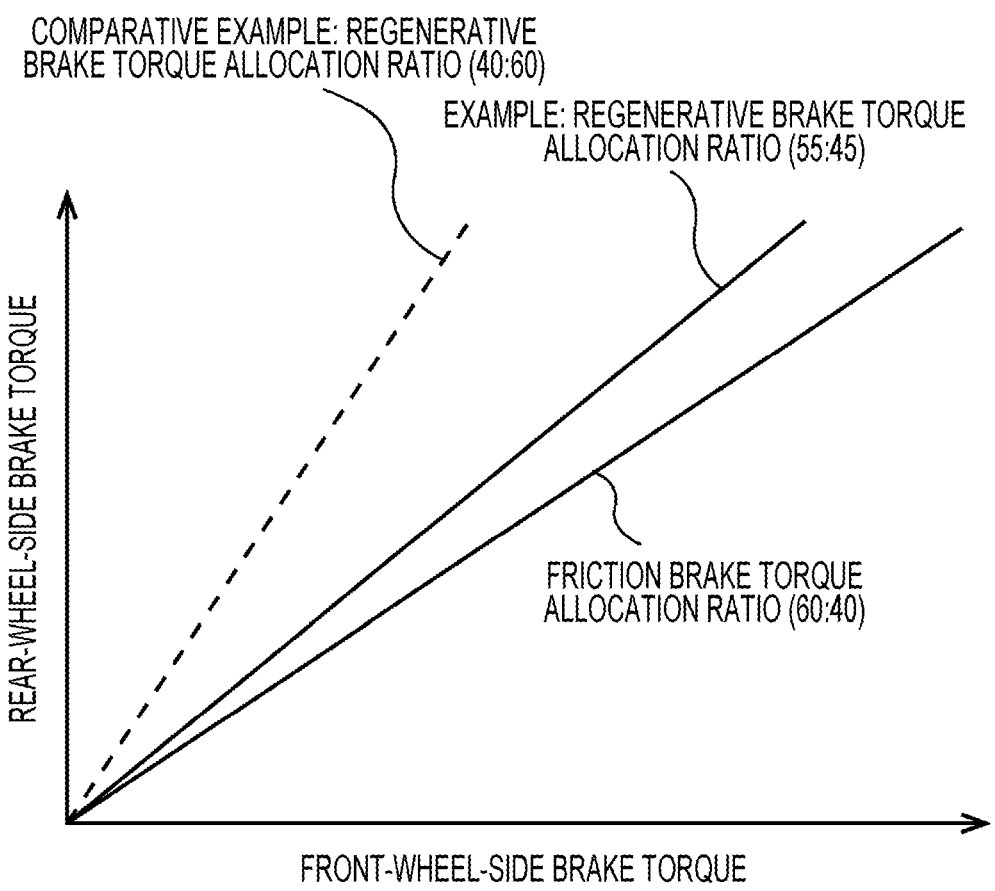
FIG. 5 illustrates a front/rear allocation ratio of friction brake torque and a front/rear allocation ratio of regenerative brake torque.

FIG. 5 illustrates the front/rear allocation ratio of regenerative brake torque and the front/rear allocation ratio of friction brake torque. For example, it is assumed that the allocation ratio of friction brake torque (the front-wheel side:the rear-wheel side) is 60:40. With the allocation ratio of regenerative brake torque (the front-wheel side:the rear-wheel side=40:60) of a comparative example indicated by a dashed line, when the proportions in the requested brake torque suddenly change from the proportions in which the proportion of regenerative brake torque is relatively large to the proportions in which the proportion of friction brake torque is relatively large, the brake torque allocated to the front-wheel side suddenly increases. In such a case, an understeer, spinout, or another kind of behavior can occur, for example, when the friction coefficient of the road surface is small. By contrast, with the allocation ratio of regenerative brake torque (the front-wheel side:the rear-wheel side=55:45) of the example indicated by a solid line, when the proportions in the requested brake torque suddenly change from the proportions in which the proportion of regenerative brake torque is relatively large to the proportions in which the proportion of friction brake torque is relatively large, the brake torque allocated to the front-wheel side increases by a less amount. In this case, the likelihood of an understeer, spinout, or another kind of behavior is reduced.

The allocation ratio of regenerative brake torque is set to any allocation ratio depending on the design of the first differential mechanism 10L and the second differential mechanism 10R. In the present embodiment, in the case where the allocation ratio of regenerative brake torque allocated to the front-wheel side is 50% or more, it is possible to reduce the likelihood of a sudden change in the allocation ratio when the proportions in the requested brake torque suddenly change from the proportions in which the proportion of regenerative brake torque is relatively large to the proportions in which the proportion of friction brake torque is relatively large. To enhance the effectiveness of the torque vectoring control during turning described above, it is undesirable to make the allocation ratio of the rear-wheel side considerably low. Overall, it is preferable that the allocation ratio of torque divided between the front-wheel side and the rear-wheel side (the front-wheel side:the rear-wheel side) achieved with the first differential mechanism 10L and the second differential mechanism 10R be in the range of 50:50 to 60:40.

4. Processing Operations

Figure 6:
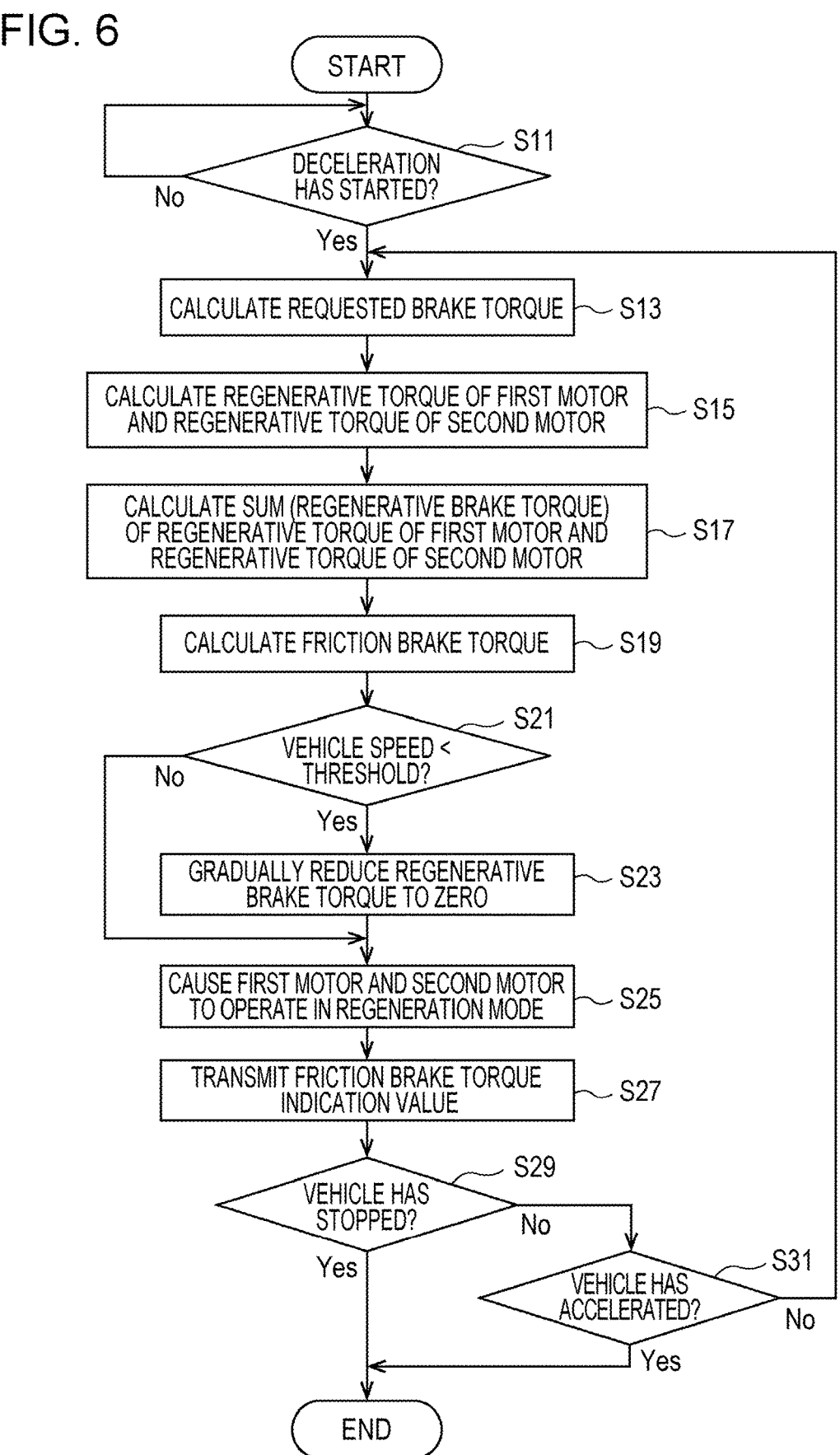
FIG. 6 is a flowchart illustrating a braking process of the drive system for a four-wheel drive vehicle according to the embodiment.

The following describes an instance of cooperative brake control processing operations for a four-wheel drive vehicle performed by the control device 50 with reference to FIG. 6.

Firstly, the control device 50 determines whether the four-wheel drive vehicle has started to decelerate (step S11). The control device 50 determines that the four-wheel drive vehicle has started to decelerate, for example, when any of the following conditions is satisfied: the distance of how far the brake pedal is pushed or the magnitude of force applied on the brake pedal exceeds a predetermined threshold; the speed at which the accelerator pedal is released exceeds a predetermined threshold; an instruction to decelerate according to automatic driving control is received. When it is not determined that the four-wheel drive vehicle has started to decelerate (No in step S11), the control device 50 repeats the determination operation in step S11.

By contrast, when it is determined that the four-wheel drive vehicle has started to decelerate (Yes in step S11), the control device 50 calculates the requested brake torque (step S13). The control device 50, for example, refers to a map or another kind of data previously stored in the memory and accordingly calculates the requested brake torque based on the distance of how far the brake pedal is pushed or the magnitude of force applied on the brake pedal, or the speed at which the accelerator pedal is released. When information of the requested brake torque is transmitted by a control device for providing automatic driving control, the control device 50 obtains the information of the requested brake torque.

Next, the control device 50 calculates the regenerative torque to be generated by the first motor 20L and the regenerative torque to be generated by the second motor 20R (step S15). For example, the control device 50 obtains information of the rotation speed of the first motor 20L and information of the rotation speed of the second motor 20R and calculates the regenerative torque that the first motor 20L is able to generate and the regenerative torque that the second motor 20R is able to generate. For example, while the four-wheel drive vehicle decelerates, the control device 50 causes the first motor 20L and the second motor 20R on the left and right sides to generate the same regenerative torque. To do this, the control device 50 compares a smaller value between the regenerative torque that the first motor 20L is able to generate and the regenerative torque that the second motor 20R is able to generate with the value obtained by multiplying the requested brake torque by 0.5; and the control device 50 designates a smaller value between these values as the regenerative torque to be generated by the first motor 20L and the second motor 20R.

Next, the control device 50 calculates the sum with respect to the regenerative torque calculated in step S15 (step S17). As a result, the value obtained by doubling the calculated regenerative torque is the value of regenerative brake torque in the requested brake torque.

Next, the control device 50 calculates the friction brake torque (step S19). For example, the control device 50 subtracts the regenerative brake torque from the requested brake torque and designates the residual deficiency as the friction brake torque. The control device 50 may refer to a map or another kind of data previously stored for cooperative brake control and calculate the friction brake torque based on the requested brake torque, and the vehicle speed or the rotation speed of the first motor 20L and the second motor 20R.

Next, the control device 50 determines whether the vehicle speed of the four-wheel drive vehicle is lower than the predetermined threshold V_thr that is preset (step S21). The threshold V_thr corresponds to a vehicle speed that is achievable with the minimum motor rotation speed at which the first motor 20L and the second motor 20R stably generate regenerative brake torque; the threshold V_thr is preset to a predetermined value.

When the vehicle speed of the four-wheel drive vehicle is not lower than the predetermined preset threshold V_thr (No in step S21), the control device 50 causes the first motor 20L and the second motor 20R to operate in the regeneration mode, targeting the regenerative torque calculated in step S15 (step S25). As a result, regenerative braking force is generated. The control device 50 transmits the value of friction brake torque calculated in step S19 as an indication value to the brake control device 71 (step S27). Based on the indication value of friction brake torque, the brake control device 71 controls actuation of the hydraulic unit 73 to generate friction braking force.

By contrast, when the vehicle speed of the four-wheel drive vehicle is lower than the predetermined preset threshold V_thr (Yes in step S21), the control device 50 gradually reduces regenerative brake torque to zero (step S23). When the control device 50 gradually reduces regenerative brake torque, the control device 50 provides adjustment to friction brake torque by increasing friction brake torque by the reduced amount of regenerative brake torque, so that the requested brake torque is maintained by regenerative brake torque and friction brake torque. As a result, while the proportion of regenerative brake torque in the requested brake torque declines, the proportion of friction brake torque in the requested brake torque rises.

Next, the control device 50 causes the first motor 20L and the second motor 20R to operate in the regeneration mode, targeting the value obtained by multiplying the regenerative brake torque calculated in step S23 by 0.5 (step S25). As a result, regenerative braking force is generated. The control device 50 transmits the value of friction brake torque adjusted in step S23 as an indication value to the brake control device 71 (step S27). Based on the indication value of friction brake torque, the brake control device 71 controls actuation of the hydraulic unit 73 to generate friction braking force.

After the four-wheel drive vehicle starts to decelerate, from the time when the vehicle speed falls below the threshold V_thr, the requested brake torque changes from the state in which the regenerative brake torque dominates the requested brake torque to the state in which the friction brake torque dominates the requested brake torque. However, the drive system 1 according to the present embodiment is configured such that with respect to the output torque of the first motor 20L and the second motor 20R divided by the first differential mechanism 10L and the second differential mechanism 10R, the allocation ratio of the output torque allocated to the front-wheel side is 50% or more. Thus, although the requested brake torque changes from the state in which the regenerative brake torque dominates the requested brake torque to the state in which the friction brake torque dominates the requested brake torque, this configuration reduces the likelihood of a sudden change in the allocation ratio of brake torque between the front-wheel side and the rear-wheel side.

Next, the control device 50 determines whether the four-wheel drive vehicle has stopped (step S29). For example, when the vehicle speed is zero, the control device 50 determines that the four-wheel drive vehicle has stopped. When the four-wheel drive vehicle has not stopped (No in step S29), the control device 50 determines whether the four-wheel drive vehicle has accelerated (step S31). For example, when the driver has pushed the accelerator pedal, or when an instruction to accelerate according to automatic driving control has been received, the control device 50 determines that the four-wheel drive vehicle has accelerated. When the four-wheel drive vehicle has not accelerated (No in step S31), the control device 50 returns to step S13 and repeats the operations in the steps described above.

By contrast, when it is determined that the four-wheel drive vehicle has stopped (Yes in step S29), or when it is determined that the four-wheel drive vehicle has accelerated (Yes in step S31), the control device 50 ends the deceleration process. Afterward, until the drive system 1 stops, the process returns to step S11, and the operations in the steps described above are repeated.

As described above, in the drive system 1 according to the embodiment of the disclosure, differential mechanisms for dividing output torque between the front-wheel side and the rear-wheel side are provided respectively for the first motor 20L and the second motor 20R; the output torque allocated to the left front-wheel side and the output torque allocated to the right front-wheel side are combined together; the combined output torque is then transmitted through the right-angle gears and the propeller shaft to the front-wheel side. With this configuration, no device for canceling differential rotation of the front and rear sides is to be provided in the propeller shaft, and torque transmission to the front, rear, left, and right drive wheels is controlled by controlling the output torque of the first motor 20L and the second motor 20R.

Further, both of the first differential mechanism 10L and the second differential mechanism 10R are configured such that the allocation ratio of output torque allocated to the front-wheel side is 50% or more. As a result, the allocation ratio of output torque is close to the allocation ratio of friction brake torque. This configuration reduces the likelihood of a sudden change in the allocation ratio of brake torque between the front-wheel side and the rear-wheel side when the vehicle speed of the electric-motor propelled four-wheel drive vehicle is considerably low; in this low-speed state, while the proportion of regenerative brake torque declines, the proportion of friction brake torque rises. As a result, it is possible to hinder unstable vehicle behavior.

A preferred embodiment of the disclosure has been described in detail with reference to the accompanying drawings, but the disclosure is not limited to this example. It is understood that various modifications and alterations within the scope of the technical idea indicated in the appended claims may occur to those skilled in the art and are also embraced within the technical scope of the disclosure.

For example, in the drive system 1 according to the embodiment, the first motor 20L and the second motor 20R respectively correspond to the left rear wheel 3LR and the right rear wheel 3RR, and output torque is transmitted through the common intermediate output shaft 21 and the common propeller shaft 23 to the left front wheel 3LF and the right front wheel 3RF. The technology of the disclosure is, however, not limited to this instance. The first motor 20L and the first differential mechanism 10L may correspond to the left front wheel 3LF, and the second motor 20R and the second differential mechanism 10R may correspond to the right front wheel 3RF. With this configuration, output torque may be transmitted through a common intermediate output shaft and a common propeller shaft to the left rear wheel 3LR and the right rear wheel 3RR. For example, when the configuration of the drive system 1 according to the embodiment is applied to a vehicle designed mainly for motorsport driving, the running stability is more effectively improved.

In the drive system 1 according to the embodiment, a portion of the output torque of the first motor 20L and a portion of the output torque of the second motor 20R are transmitted to the front-wheel side through the intermediate output shaft 21 with the sun gears 15L and 15R, which are disposed on both ends of the intermediate output shaft 21, and the first right-angle gear 31. The technology of the disclosure is, however, not limited to this instance. For example, a common output shaft with a right-angle gear and an output shaft for receiving the output torque distributed to the front-wheel side by the first differential mechanism 10L and the second differential mechanism 10R may be coupled to each other with a gear train.

In the drive system 1 according to the embodiment, limited slip differential gears may be provided respectively for the first differential mechanism 10L and the second differential mechanism 10R. The control device 50 controls actuation of the limited slip differential gears. Under this control, the limited slip differential gears are operable to limit differential operations of the first differential mechanism 10L and the second differential mechanism 10R. For example, when the left rear wheel 3LR is slipping, the rolling resistance of the left rear wheel 3LR is considerably lower than the rolling resistance of the intermediate output shaft 21 coupled to the front-wheel side. While the left rear wheel 3LR is slipping, the limited slip differential gear limits the differential operation of the first differential mechanism 10L to redistribute the output torque of the first motor 20L to another drive wheel through the intermediate output shaft 21. This configuration makes it easy to release the vehicle from the slip state and start the vehicle.

In the embodiment, the instance in which brake torque (Nm) is used to compute requested braking force (N), regenerative braking force (N), and friction braking force (N) is described. The technology of the disclosure is, however, not limited to this instance. The computation may be carried out using another kind of indicator.

The control device 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive system for a four-wheel drive vehicle driven by electric motors, the four-wheel drive vehicle comprising a friction brake system, the drive system comprising:

a first motor and a second motor;

a propeller shaft configured to transmit power between a front-wheel side and a rear-wheel side;

a first differential mechanism coupled to the first motor, the first differential mechanism being configured to divide output torque of the first motor between a first side of the front-wheel side and the rear-wheel side and a left wheel on a second side of the front-wheel side and the rear-wheel side that is different from the first side;

a second differential mechanism coupled to the second motor, the second differential mechanism being configured to divide output torque of the second motor between the first side and a right wheel on the second side; and a control device configured to control regenerative braking force acting as a result of causing the first motor and the second motor to operate in a regeneration mode and friction braking force generated by the friction brake system, wherein each of the first differential mechanism and the second differential mechanism is configured such that an allocation ratio of regenerative brake torque allocated to the front-wheel side is 50% or more.

2. The drive system for a four-wheel drive vehicle according to claim 1, wherein the control device is configured to while the four-wheel drive vehicle decelerates, perform cooperative control to make a sum of the regenerative braking force and the friction braking force equal to a predetermined value of requested braking force, and when a vehicle speed of the four-wheel drive vehicle changes from a vehicle speed higher than or equal to a predetermined threshold to a vehicle speed lower than the predetermined threshold, increase a proportion of the friction braking force with respect to the requested braking force.

3. The drive system for a four-wheel drive vehicle according to claim 1, wherein the second side is the rear-wheel side, and the first side is the front-wheel side.

4. The drive system for a four-wheel drive vehicle according to claim 1, while the four-wheel drive vehicle decelerates, perform cooperative control to make a sum of the regenerative braking force and the friction braking force equal to a predetermined value of requested braking force.

5. The drive system for a four-wheel drive vehicle according to claim 1, when a vehicle speed of the four-wheel drive vehicle changes from a vehicle speed higher than or equal to a predetermined threshold to a vehicle speed lower than the predetermined threshold, increase a proportion of the friction braking force with respect to the requested braking force.

6. The drive system for a four-wheel drive vehicle according to claim 1, wherein the control device compares a smaller value between a regenerative torque that the first motor is able to generate and a regenerative torque that the second motor is able to generate with the value obtained by multiplying a requested brake torque by 0.5.

7. The drive system for a four-wheel drive vehicle according to claim 6, wherein and the control device designates a smaller value between the value and the smaller value as the regenerative torque to be generated by the first motor and the second motor.

8. The drive system for a four-wheel drive vehicle according to claim 1, wherein an allocation ratio of output torque is substantially a same as an allocation ratio of friction brake torque.

9. The drive system for a four-wheel drive vehicle according to claim 1, wherein each of the first differential mechanism and the second differential mechanism is individually configured such that an allocation ratio of output torque allocated to the front-wheel side is at least 50%.

10. The four-wheel drive vehicle comprising the drive system according to claim 1.

11. A computer program stored in a computer readable medium and executable on a control device for a drive system for a four-wheel drive vehicle driven by electric motors, the four-wheel drive vehicle comprising a friction brake system, the drive system including a first motor and a second motor, a propeller shaft configured to transmit power between a front-wheel side and a rear-wheel side, a first differential mechanism coupled to the first motor, the first differential mechanism being configured to divide output torque of the first motor between a first side of the front-wheel side and the rear-wheel side and a left wheel on a second side of the front-wheel side and the rear-wheel side that is different from the first side, a second differential mechanism coupled to the second motor, the second differential mechanism being configured to divide output torque of the second motor between the first side and a right wheel on the second side, the program comprising instructions for the control device to:

control regenerative braking force acting as a result of causing the first motor and the second motor to operate in a regeneration mode and friction braking force generated by the friction brake system; and control each of the first differential mechanism and the second differential mechanism such that an allocation ratio of regenerative brake torque allocated to the front-wheel side is 50% or more.

12. The computer program according to claim 11, wherein the program further comprising instructions for the control device to:

while the four-wheel drive vehicle decelerates, perform cooperative control to make a sum of the regenerative braking force and the friction braking force equal to a predetermined value of requested braking force; and when a vehicle speed of the four-wheel drive vehicle changes from a vehicle speed higher than or equal to a predetermined threshold to a vehicle speed lower than the predetermined threshold, increase a proportion of the friction braking force with respect to the requested braking force.

13. The computer program according to claim 11, wherein the second side is the rear-wheel side, and the first side is the front-wheel side.

14. The computer program according to claim 11, wherein the program further comprising instructions for the control device to while the four-wheel drive vehicle decelerates, perform cooperative control to make a sum of the regenerative braking force and the friction braking force equal to a predetermined value of requested braking force.

15. The computer program according to claim 11, wherein the program further comprising instructions for the control device to:

when a vehicle speed of the four-wheel drive vehicle changes from a vehicle speed higher than or equal to a predetermined threshold to a vehicle speed lower than the predetermined threshold, increase a proportion of the friction braking force with respect to the requested braking force.

16. The computer program according to claim 11, wherein the program further comprising instructions for the control device to: compare a smaller value between a regenerative torque that the first motor is able to generate and a regenerative torque that the second motor is able to generate with the value obtained by multiplying a requested brake torque by 0.5.

17. The computer program according to claim 11, wherein the program further comprising instructions for the control device to:

designate a smaller value between the value and the smaller value as the regenerative torque to be generated by the first motor and the second motor.

18. The computer program according to claim 11, wherein an allocation ratio of output torque is substantially a same as an allocation ratio of friction brake torque.

19. The computer program according to claim 11, wherein each of the first differential mechanism and the second differential mechanism is individually configured such that an allocation ratio of output torque is controlled to be allocated to the front-wheel side is at least 50%.

20. The four-wheel drive vehicle being controlled by the computer program according to claim 11.

* * * * *